United States Patent
Shelton et al.

(10) Patent No.: US 12,514,429 B2
(45) Date of Patent: Jan. 6, 2026

(54) SYSTEMS AND METHODS FOR DETERMINING TARGET CHARACTERISTICS DURING A LASER PROCEDURE

(71) Applicant: GYRUS ACMI, INC., Westborough, MA (US)

(72) Inventors: Kurt G. Shelton, Bedford, MA (US); Jane Bareau, Needham, MA (US)

(73) Assignee: Gyrus ACMI, Inc., Westborough, MA (US)

( * ) Notice: Subject to any disclaimer, the term of this patent is extended or adjusted under 35 U.S.C. 154(b) by 594 days.

(21) Appl. No.: 17/938,826

(22) Filed: Oct. 7, 2022

(65) Prior Publication Data

US 2023/0115488 A1 Apr. 13, 2023

Related U.S. Application Data

(60) Provisional application No. 63/365,886, filed on Jun. 6, 2022, provisional application No. 63/262,290, filed on Oct. 8, 2021.

(51) Int. Cl.
*A61B 5/00* (2006.01)
*A61B 1/00* (2006.01)
(Continued)

(52) U.S. Cl.
CPC .......... *A61B 1/000094* (2022.02); *A61B 1/04* (2013.01); *A61B 1/063* (2013.01);
(Continued)

(58) Field of Classification Search
CPC ..... A61B 1/000094; A61B 1/04; A61B 1/063; A61B 18/24; A61B 2017/00057;
(Continued)

(56) References Cited

U.S. PATENT DOCUMENTS 4,621,284 A * 11/1986 Nishioka ............... A61B 5/1076
348/69
6,388,742 B1 * 5/2002 Duckett ................. G01M 11/30
356/73.1
(Continued)

FOREIGN PATENT DOCUMENTS

CN 111948798 11/2020
DE 102022126028 4/2023
(Continued)

OTHER PUBLICATIONS

"Japanese Application Serial No. 2022-163175, Response filed Dec. 8, 2023 to Notification of Reasons for Rejection mailed Sep. 25, 2023", w english claims, 10 pgs.
(Continued)

*Primary Examiner* — Howard D Brown, Jr.
(74) *Attorney, Agent, or Firm* — Schwegman Lundberg & Woessner, P.A.

(57) ABSTRACT

Disclosed are systems and methods for determining target characteristics during a laser procedure, comprising (i) obtaining a relationship between (i) a number of pixels associated with a light beam reflected from a target or an object located in proximity to the target on an endoscopic image obtained from a video sensor coupled to an endoscope and (ii) a distance of the target from a tip of the endoscope. The method further comprising (ii) measuring the number of pixels associated with the light beam reflected from the target or the object located in proximity to the target during a procedure, and (iii) based at least in part on the relationship obtained in step (i) and the measured number of pixels in step (ii), determining at least one of a size of the target or a distance of the target from the tip of the endoscope.

19 Claims, 9 Drawing Sheets

(51) Int. Cl.
*A61B 1/04* (2006.01)
*A61B 1/06* (2006.01)
*A61B 18/24* (2006.01)
*A61B 17/00* (2006.01)
*A61B 18/00* (2006.01)
*A61B 34/00* (2016.01)

(52) U.S. Cl.
CPC .... *A61B 18/24* (2013.01); *A61B 2017/00057* (2013.01); *A61B 2017/00725* (2013.01); *A61B 2018/00904* (2013.01); *A61B 2018/00982* (2013.01); *A61B 2034/252* (2016.02)

(58) Field of Classification Search
CPC ........... A61B 2017/00725; A61B 2018/00904; A61B 2018/00982; A61B 2034/252; A61B 2562/0219; A61B 5/1079; A61B 5/1076; A61B 90/361; A61B 18/26; A61B 2018/00511; A61B 2018/00577; A61B 2018/00642; A61B 2018/0066; A61B 2018/00726; A61B 2018/00732; A61B 2018/00761; A61B 2018/2025; A61B 2090/061; A61B 2090/3937
See application file for complete search history.

(56) References Cited

U.S. PATENT DOCUMENTS

| | | | | |
|---|---|---|---|---|
| 2005/0240077 | A1* | 10/2005 | Rovegno | G02B 23/2423 600/117 |
| 2008/0125634 | A1* | 5/2008 | Ryan | A61B 5/145 606/15 |
| 2009/0227997 | A1* | 9/2009 | Wang | A61B 18/24 606/10 |
| 2015/0018807 | A1* | 1/2015 | Kircher | A61B 18/02 606/12 |
| 2018/0092513 | A1* | 4/2018 | Melsheimer | A61B 1/00096 |
| 2018/0213207 | A1* | 7/2018 | Wilson | A61B 1/0605 |
| 2019/0043188 | A1* | 2/2019 | Wang | G06T 7/62 |
| 2019/0304121 | A1* | 10/2019 | Wang | G06T 7/85 |
| 2019/0374155 | A1* | 12/2019 | Wang | A61B 1/2736 |
| 2021/0038304 | A1 | 2/2021 | Bukesov et al. | |
| 2021/0150706 | A1* | 5/2021 | Chen | G06T 11/203 |
| 2021/0275000 | A1 | 9/2021 | Ramesh et al. | |
| 2021/0378745 | A1 | 12/2021 | Fukushima et al. | |
| 2022/0166178 | A1* | 5/2022 | Altman | H01S 3/10038 |
| 2023/0031136 | A1* | 2/2023 | Ikuma | A61B 1/018 |

FOREIGN PATENT DOCUMENTS

| | | |
|---|---|---|
| JP | 2011000258 | 1/2011 |
| JP | 2011139734 | 7/2011 |
| JP | 2018202104 | 12/2018 |
| JP | 2020000286 | 1/2020 |
| JP | 2020174686 | 10/2020 |
| JP | 2021101900 | 7/2021 |
| JP | 7460723 | 4/2024 |
| JP | 7659105 | 4/2025 |
| WO | 2018180249 | 10/2018 |
| WO | 2020189334 | 9/2020 |
| WO | 2021026144 | 2/2021 |

OTHER PUBLICATIONS

"Indian Application Serial No. 202244057646, First Examination Report mailed Dec. 21, 2023", 7 pgs.

"Japanese Application Serial No. 2022-163175, Notification of Reasons for Rejection mailed Sep. 25, 2023", W English Translation, 11 pgs.

"Indian Application Serial No. 202244057646, Response filed Jun. 20, 2024 to First Examination Report mailed Dec. 21, 2023", w claims, 35 pgs.

"Indian Application Serial No. 202244057646, Hearing Notice mailed Jun. 13, 2025", 3 pgs.

"Indian Application Serial No. 202244057646, Response filed Aug. 21, 2025 to Hearing Notice mailed Jun. 13, 2025", w claims, 29 pgs.

\* cited by examiner

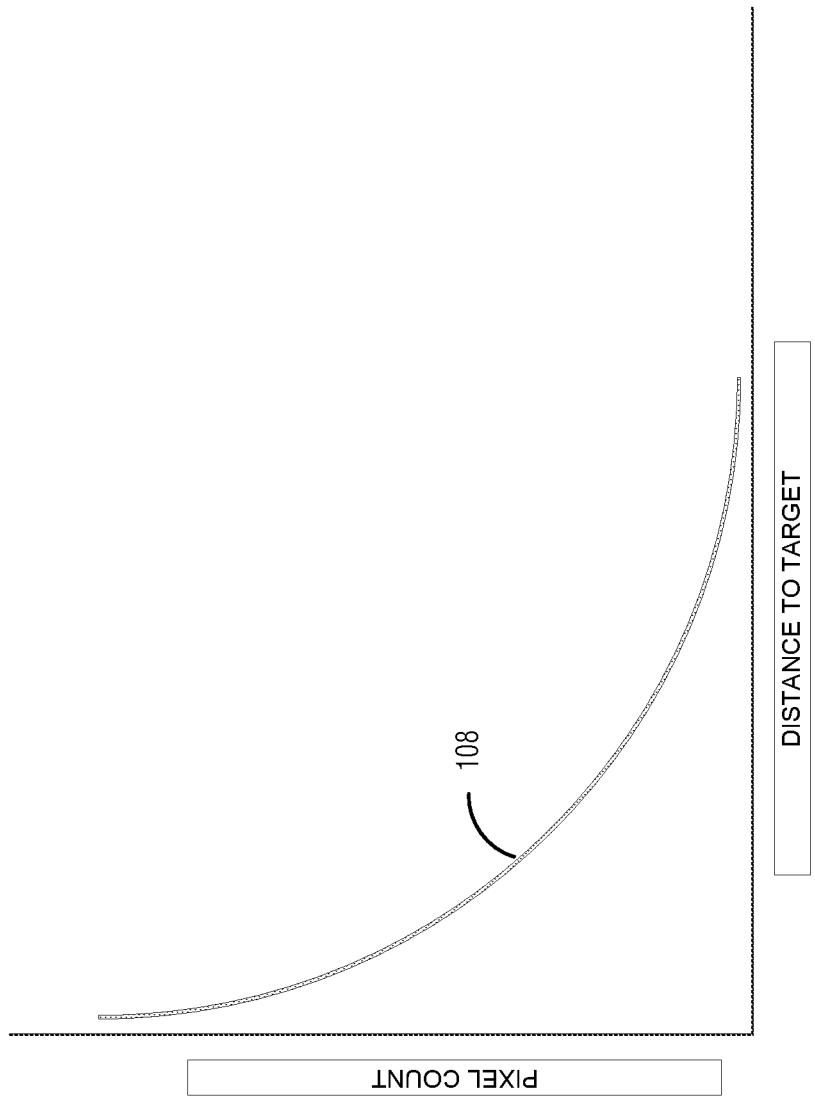

SYSTEMS AND METHODS FOR DETERMINING TARGET CHARACTERISTICS DURING A LASER PROCEDURE

PRIORITY CLAIM

This application claims the benefit of priority to U.S. Provisional Patent Application Ser. No. 63/262,290 filed Oct. 8, 2021 and U.S. Provisional Patent Application Ser. No. 63/365,886 filed Jun. 6, 2022, the contents of which are hereby incorporated by reference in their entireties.

TECHNICAL FIELD

The present disclosure relates to determining characteristics of a target during laser procedures.

BACKGROUND

During surgical laser procedures, such as laser lithotripsy, a physician may be required to interact with targets of various sizes, such as a tumor, a stone, a piece of tissue, or the like, in a patient's body. The targets may be located in a medium (e.g., a liquid medium such as water or saline), and the physician may use a scope, such as an endoscope for surgical procedures on the target. The scope can include a laser fiber tip, an endoscopic image sensor, or the like, attached, or connected to an end of the scope.

SUMMARY

Endoscopes and other similar surgical scopes or catheters can be used in a variety of surgical procedures. For example, in ear, nose, and throat (ENT) procedures such as a tonsillectomy, sinus surgery, or other similar procedures, procedures in the digestive system, or procedures inside the abdomen. Many endoscopic procedures, such as lithotripsy or other similar procedures (e.g., tumor removal, tissue ablation procedures, or kidney stone ablation/removal) may utilize laser light in conjunction with an imaging sensor such as a camera attached to an end of the scope.

It is important for a physician to know the dimensions of a target, such as a tumor or a stone when performing either diagnostic or therapeutic procedures. For example, a physician attempting to visualize a cancerous tumor needs to determine the dimensions (e.g., height and width) of the tumor in order to determine whether a tumor can be surgically removed, to determine a baseline measurement for the tumor to monitor changes in the size of the tumor after cancer treatment has begun, or the like. Similarly, a physician performing an endoscopic procedure such as stone or tissue ablation or removal may need to determine the size of the stone or piece of tissue to be removed in order to decide if the target is small enough to remove using the scope, such as removal through a ureter or an access sheath with a particular inner diameter, or whether the target must be reduced further before removal. Further, during laser procedures such as laser lithotripsy, the physician may need to know the distance between the tip of the scope and the target. The distance between the tip of the scope and the target are important to determine, for example, the amount/intensity of laser light/radiation to deliver to the target and/or to monitor the conditions of the medium.

A calibration process, performed either before a medical procedure or at the very beginning of a procedure, can be used to obtain a relationship between a pixel measurement (e.g., the total number of pixels) of (i) a beam dimension (e.g., a laser beam diameter footprint, a cross-sectional area of a laser beam, a laser beam radius, or an arc length of a footprint of a laser beam) and/or (ii) an object dimension (e.g., a diameter, cross-sectional area, a perimeter, a radius or an arc length of a laser fiber tip) on an endoscopic image and a distance of the target from the tip of the endoscope. In an example, the relationship can be between a measurement in number of pixels in a video image of 1) a light reflection from a target or 2) an object such as a laser fiber in close proximity to the target (e.g., within 1 μm, 10 μm, 100 μm or 1 mm) or directly contacting the target, and the 1) size of that light image or fiber in close proximity to the surface of the target (e.g., within 1 μm, 10 μm, 100 μm or 1 mm) or directly contacting the target, and/or 2) distance of the target from the tip of the endoscope. Then, based on the determined relationship, a calibration curve can be obtained which can allow for the distance of any target from the tip of the endoscope or size of the target to be determined. As used herein, the terms "in close proximity to" and "in proximity to" refer to a situation in which the object (e.g., laser fiber) almost touches the target or at most has a distance of X mm from the target, where X is based on the desired measurement accuracy. For example, if the desired measurement accuracy is ±1%, the object (e.g., laser fiber) may be within 1% of the distance from the tip of the endoscope to the target. In one example, assuming the distance between the tip of the endoscope and the target is 10 mm, and the desired measurement accuracy is at least 1%, then the object (e.g., fiber tip) may be no more than 0.1 mm from the target when performing the calibration process. Generally, a closer distance may provide a greater measurement accuracy.

In an implementation, the calibration process takes advantage of the fact that when the laser fiber tip is close to the target surface in the medium, the diameter of the laser aiming beam footprint is equal to the diameter of the glass of the laser fiber, which is a known diameter, and that the index of refraction of the media proximate to the target or an anatomical feature corresponds to a change in the pixel count of the aiming beam footprint diameter on the video image when the endoscope and/or the tip of the fiber is moved with respect to the target. As a result, the relationship between the pixel measure of the laser beam diameter (or other parameters such as a cross-sectional area of the laser beam, a laser beam radius, or an arc length of a footprint of the laser beam) on the endoscopic image and the distance of the target from the tip of the endoscope can be determined. Based on this relationship, touching the tip of the fiber to any target can then provide a scale for the video system to measure its size and distance from the video sensor (or tip of the endoscope). In an example, touching the tip of the fiber to the target may not be required for calibration. In such an example, the system can complete the calibration process as long as the tip of the fiber is visible in the field of view of the video sensor attached to the endoscope.

The calibration process can entail operations or steps such as detecting a laser aiming beam circle/footprint or the fiber tip at a first location/distance proximate to a target, measuring a diameter, cross-sectional area or other related parameters (e.g., a perimeter, a radius or an arc length) of the laser aiming beam footprint or fiber tip in pixels on a video image at the first location/distance (first pixel count), measuring a first distance or a first amount of the laser fiber extending from the scope/video sensor, moving at least a portion of the endoscope to a second location/distance relative to the first location/distance with respect to the target, measuring a second diameter, cross-sectional area or other related parameters (e.g., a perimeter, a radius or an arc length) of the laser aiming beam footprint or fiber tip in pixels on a video image at the second location (second pixel count), and measuring a second distance or a second amount of the laser fiber extending from the scope/video sensor at the second location/distance. Subsequently, a relationship between the pixel measurements and the distance of the target from the tip of the endoscope can be established. Prior to and/or during laser treatment, a distance between the target and the tip of the endoscope can be determined based at least in part on the established relationship and the pixel measurement of the laser beam diameter (or other parameters such as a cross-sectional area of the laser beam, a laser beam radius, or an arc length of a footprint of the laser beam) acquired during treatment by touching the tip of the laser fiber to the target (or moving the tip of the laser fiber close to the target without touching the target).

Optionally, the method may include determining an index of refraction of the media (e.g., water or saline) proximate to the target or an anatomical feature. The index of refraction can be determined based on a ratio of the initial pixel count of the aiming beam footprint diameter (or a cross-sectional area of the laser beam, the laser beam radius, or an arc length of a footprint of the laser beam) and a change in the diameter of the laser aiming beam footprint (or the cross-sectional area of the laser beam, the laser beam radius, or the arc length of a footprint of the laser beam) between the first location and the second location. Or stated another way, a change in the diameter of the aiming beam footprint (or the cross-sectional area of the laser beam, the laser beam radius, or an arc length of a footprint of the laser beam) when the endoscope is moved with respect to the target and/or the tip of the fiber.

In addition, the method may further include, measuring a number of pixels corresponding to a beam dimension, such as the target area covered by the laser beam dimension footprint, a cross-sectional area of the laser beam, the laser beam radius, or an arc length of a footprint of the laser beam on an endoscopic image, and based thereon, determining at least a dimension (e.g., a height or a width) or other characteristic of the target. For example, the pixel size can be computed by dividing the diameter of the laser aiming beam by its corresponding total number of pixels on the endoscopic image; based on the computed pixel size and the total number of pixels corresponding to the target height/width on the endoscopic image, the height/width of the target can be estimated.

As stated above, the relationship between the pixel measurement on the endoscopic image and the distance of the target from the tip of the endoscope can be determined using an object dimension such as a diameter, a cross sectional area, a perimeter, a radius, or an arc length of a laser fiber tip. In this implementation, the calibration process can include measuring a dimension of the fiber tip (e.g., a diameter, a cross sectional area, a perimeter, a radius, or an arc length of a laser fiber tip) in pixels on a video image at a first location proximate to a target (a first pixel count) and measuring a first amount of the laser fiber extending from the scope at the first location (e.g., utilizing a marking or markings on the insulating jacket of the laser fiber that can be seen by the endoscopic camera). The calibration process can then include moving at least a portion of the scope to a second location with respect to the target and measuring the dimension of the fiber tip in pixels on a video image at the second location (second pixel count) and measuring a second amount of the laser fiber extending from the scope at the second location.

Additionally or alternatively, the calibration curve can be theoretically computed based on the known parameters such as the aiming beam dimension, a number of vertical pixels of the endoscopic sensor (e.g., camera), and the vertical field of view in a medium. For example, for each distance or location, the height corresponding to the half angle of the field of view in the medium can be first determined based on the vertical field of view in the medium. From there, the number of pixels per millimeter on the endoscopic image and the number of pixels corresponding to a particularly sized laser fiber can be calculated. These steps can be iteratively performed to obtain the numbers of pixels corresponding to the particularly sized laser at different distances or locations, thereby establishing the calibration curve. It should be noted that the parameters used in the calibration process can vary depending on whether the curve is determined empirically or theoretically. For example, when empirically obtaining the calibration curve having a relationship between (i) the pixel measurement of the laser beam dimension and/or an object dimension on a video image and (ii) the distance of the target from the tip of the endoscope, may not be necessary.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1C illustrates an example of a calibration curve obtained empirically by the process described in FIGS. 1A and 1B.

DETAILED DESCRIPTION

Figure 1A:
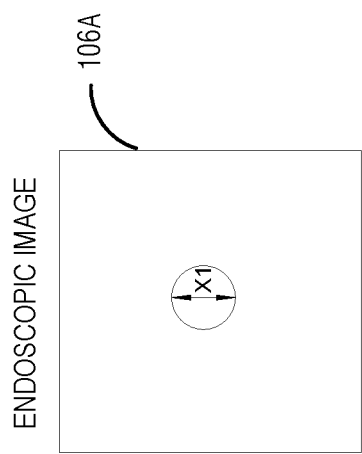
FIGS. 1A and 1B illustrate an example of a fiber tip located proximate to a target and a corresponding endoscopic image.
Figure 1A:
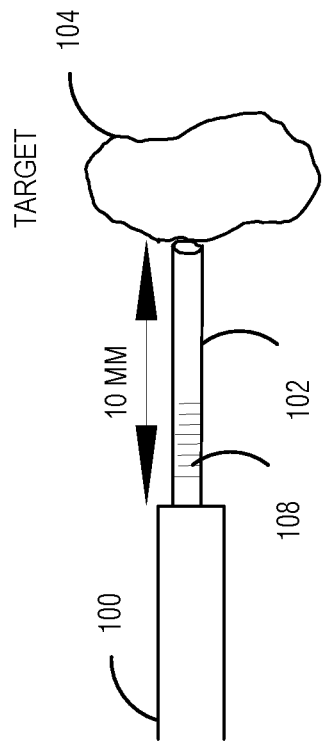

Disclosed herein are systems and methods for determining target characteristics during a laser procedure. The system can include a scope such as an endoscope, a video sensor (e.g., a camera or other endoscopic imaging sensor) employed at an end of the scope (e.g., a distal end), and a laser fiber inserted or attached to the scope. In an example, the laser fiber may be a surgical fiber connected to a probe laser, an ablation laser, or any similar laser or combination of lasers used during a laser procedure. For example, an ablation laser can emit infrared radiation while a probe laser can emit visible light to show where the tip of the scope (and therefore where ablation energy from the ablation laser is aimed) or can be used to illuminate a target. Exemplary laser fibers and systems are provided, for example, in U.S. Patent Publication Nos. 2021/0038064, 2021/0038311, and 2021/0038062, the entire contents of which are incorporated herein by reference. The target can be a piece of tissue, debris, or an object such as a tumor or a kidney stone. The fiber tip can have a known dimension such as a diameter (e.g., 200 micrometers (μm)) that can be used to calibrate a pixel count of the video sensor. In addition, when the laser fiber extends beyond the end of the scope for performing the laser procedure, a distance of the laser fiber extending from the video sensor (and thereby the end of the scope can be obtained using, for example, utilizing a marking or markings on the insulating jacket of the laser fiber that can be seen by the video sensor. Because the laser fiber is located in proximity to the target (or, in some embodiments, contacting the target) during the procedure, the distance of the laser fiber extending from the end of the scope is approximately the distance of the target from the tip of the endoscope. Based on the estimated distance of the target from the tip of the endoscope and the parameters such as the pixel count associated with a beam dimension (e.g., a laser beam diameter footprint, a cross-sectional area of a laser beam, a laser beam radius, or an arc length of a footprint of a laser beam; hereinafter "beam dimension" or "dimension of the laser beam") and/or an object dimension (e.g., a diameter, cross-sectional area, a perimeter, a radius or an arc length of a laser fiber tip; hereinafter "object dimension" or "dimension of the laser fiber") on an image acquired by the endoscope, a calibration curve can be obtained. The calibration curve can be specific to the particular type of medium the target is located in (e.g., air, water, etc.). Accordingly, once calibrated, the system may have no need to be calibrated again. This calibration curve can be determined empirically such as by the process discussed for FIGS. 1A and 1B below, or theoretically as discussed with respect to FIG. 2 below. It should be noted that the parameters used in the calibration process can vary depending on whether the curve is determined empirically or theoretically. For example, when empirically obtaining the calibration curve having a relationship between (i) the pixel measurement of the laser beam dimension and/or an object dimension on a video image and (ii) the distance of the target from the tip of the endoscope, may not be necessary.

Figure 1B:
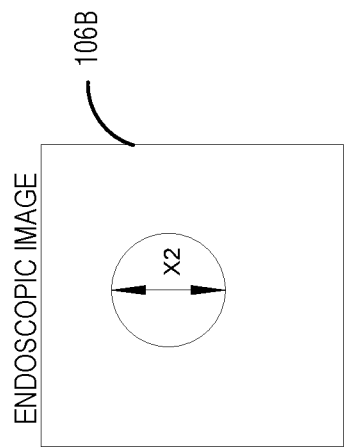
Figure 1B:
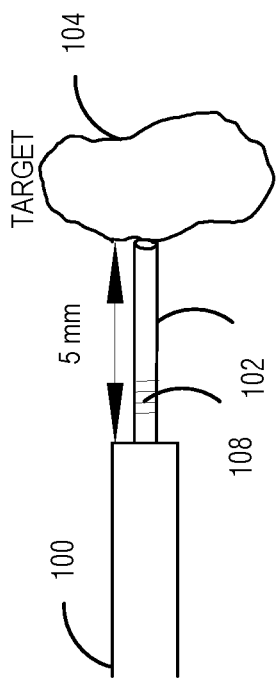

FIGS. 1A and 1B illustrate an example of a laser fiber tip located proximate to a target and a corresponding endoscopic image of a laser aiming beam footprint. In the example illustrated in FIG. 1A, an endoscope 100 with an amount of a laser fiber 102 extended 10 mm from the tip/end of the scope 100 (e.g., from a video sensor employed at a distal end of the endoscope 100) is shown. The distance of the tip of the laser fiber 102 from the tip of the endoscope can be measured using one or more markings on the laser fiber 102 (e.g., markings on the insulating jacket of the fiber scope that can be seen by the endoscopic video sensor, such as a plurality of tick marks 108). When the tip of the laser fiber 102 is positioned on or near a surface of the target 104, a pixel measurement (e.g., $X_1$ pixels) corresponding to a dimension of the laser fiber 102 (e.g., a 200 μm fiber) can be observed on the corresponding endoscopic image 106A (e.g., based on the light reflection from the target). The $X_1$ pixels can correspond to a dimension of the laser beam footprint emitted from the laser fiber 102 and/or a dimension of the glass of the tip of the laser fiber 102 (e.g., a diameter of the glass tip, or the like). The dimension of the laser beam footprint can be equal to the dimension of the glass of the tip of the laser fiber 102 when the tip of the laser fiber 102 is close to or in contact with the surface of the target 104.

When the endoscope 100 is moved closer to the target 104 (e.g., by shortening the length of the tip of the laser fiber 102 extending from the tip of the endoscope 100 or a video sensor employed at the tip of the endoscope 100, for example to 5 mm) while keeping the tip of the laser fiber 102 on or close to the surface of the target 104, the same 200 μm diameter fiber will correspond to a larger number of pixels (e.g., $X_2$ pixels) on the endoscopic image 106B. Meaning, that when the tip of the endoscope 100 is closer to the tip of the laser fiber 102 and thus to the surface of the target 104, the corresponding endoscopic image will appear larger as shown in the endoscopic images 106A and 106B. Further, a different number of the plurality of tick marks 108 may be visible depending on how much of the laser fiber 102 is extended as illustrated in FIGS. 1A and 1B, which can provide a distance indication for the tip of the laser fiber 102 from the tip of the endoscope 100 at each position relative to the target 104.

FIG. 1C illustrates an example of a calibration curve obtained empirically by the process described in FIGS. 1A and 1B. As a result of the process described above for FIGS. 1A and 1B, the relationship between the pixel measurement of the dimension of the laser beam footprint on the endoscopic image 106A, 106B and the distance of the target from the tip of the endoscope 100 can be determined. When the values of the pixel measurement and the distance are plotted as illustrated in FIG. 1C, a calibration curve 108 can be obtained. Based on the calibration curve 108, any subsequent touching of the tip of the laser fiber 102 to any target (or locating a target within the field of view of the video sensor) can provide a scale for the video system to measure its distance from the video sensor (or the tip of the endoscope 100) using a pixel measurement of the dimension of the laser beam footprint on the endoscopic image. In addition, the pixel size can be computed based on the dimension of the laser aiming beam footprint and its corresponding number of pixels on the endoscopic image 106A, 106B; and based on this computation, and the number of pixels corresponding to the target 104 on the endoscopic image 106A, 106B, the dimensions of the target 104 can be estimated. It should be noted that although FIGS. 1A-1C describe using the laser fiber to establish the calibration curve 108, any suitable object having a known dimension and located in close proximity to (e.g., 1 μm, 10 μm, 100 μm or 1 mm) the surface of the target may be utilized to establish the calibration curve in a medium based on the approaches described above and is thus within the scope of the present invention.

In an alternate example, the calibration can occur as long as the tip of the laser fiber 102 (or any suitable object) is within the field of view of the video sensor employed at the tip of the endoscope 100, regardless of whether the tip of the laser fiber 102 (or object) touches the target 104. This can be determined because the medium is known and therefore the cone of the field of view within the medium is known, as is the dimension of the laser fiber 102 (or object). Thus, the calibration can be performed based on those known parameters and the design of the endoscope 100 and the laser fiber 102. For example, if the laser fiber 102 appears on the very edge of the field of view, it can be determined that the laser fiber 102 is extended at a distance of 3-4 mm from the tip of the endoscope 100. This is a calibration based on the design of the endoscope 100 and the known dimension, such as the diameter of laser fiber 102 (e.g., 200 microns, 365 microns, etc.). Similarly, if the tip of the laser fiber 102 is close to the center of the field of view, it can be determined that the laser fiber 102 is extended at a distance of 8-10 mm from the tip of the endoscope 100. The exact distance that the tip of the laser fiber 102 is extended from the tip of the endoscope 100 can be determined from the markings on the laser fiber 102, as discussed above.

In various embodiments, the calibration curves for different types of media (e.g., water, saline, or air) can be established using the approaches described above. The endoscope 100 will be operated in one of the media (e.g., water, saline, or air) during a laser procedure. The type of medium can be input by the user, such as on a control system, a user interface, or the like, coupled/connected to the endoscope 100 prior to and/or during the laser procedure. Additionally, or alternatively, the type of medium can be determined based on divergence. For example, water and air have different indexes of reflection such that objects appear larger in water than in air. Thus, by comparing how large an object appears in the medium to its actual size, the type of the medium can be determined and the calibration curve corresponding to that medium can be used.

The medium can differ depending on the medical procedure being performed. For example, for gastrointestinal (GI) and gynecological procedures the medium is air. Therefore, in one embodiment, the system can automatically choose/select the proper medium and its corresponding calibration curve based on the procedure selected or inputted into the system by a user. For example, the surgeon can identify a GI procedure and the system can automatically select air and the calibration curve established in air. Conversely, if the procedure is to treat a biliary stone, the system can select saline as the medium and retrieve the calibration curve corresponding thereto. Then, the size of any targets found during the procedure (e.g., lesion, stone, etc.) can be estimated using the calibration curve corresponding to the selected medium.

During a medical procedure the medium can change. For example, during a GI procedure, once an endoscope is inside a bile duct, a surgeon can apply irrigation with saline. In such a situation, the system can offer both options (e.g., air or saline) for the surgeon to select. In another example, the system may automatically select the new medium type depending on which medium, air, or saline, is more prevalent. For example, if saline is applied and there is more saline in the bile duct than air, the system can determine that a new type of medium is present. Then, the system can re-calibrate the video sensor pixel count based at least in part in the change in the medium using the calibration approaches described above. Then, based on the recalibration, adjust the determined size of the target (e.g., the height or width of the target) and/or a distance of the target from the tip of the scope. Alternatively, upon detecting the presence of the new type of medium (e.g., receiving a signal indicating that the pump for applying saline to the patent's body is activated) and/or receiving an input from the surgeon indicating the presence of the new type of medium, the system may automatically retrieve the calibration curve corresponding to the new type of medium established prior to or during the procedure, and based on the retrieved calibration curve, estimating the size of the target and/or the distance of the target from the tip of the scope.

In some situations, a surgeon may use irrigation to clean off the front of the scope or to clean off a target, but the medium does not actually change. Therefore, prior to an adjustment to the medium type and change the calibration curve, the surgeon or the system can check to determine if the medium has actually changed. For example, when a laser is being used, a short, low-energy pulse may be emitted. If a vapor bubble is present, then the medium is determined to be water or saline. If there is no vapor bubble, the medium is air. In an example, such a check of the medium can be performed at any time during the procedure, and if there is an error in the selection of the medium, the medium type can be automatically corrected by the system and/or manually corrected by the surgeon. From there, the system can use the correct calibration curve (corresponding to the present medium in the patient's body) and correct an estimated size and/or distance relating to the target using the correct calibration curve.

In an example, the system can make a treatment recommendation based on the size of the target (e.g., a lesion or a polyp) and display this recommendation to the user for approval or selection. For example, depending on the size of a polyp estimated using the approaches described above, one treatment option may be to "snare" the polyp. This type of procedure may be viable if the polyp is under a certain size, whereas if the polyp is over a certain size, a different approach may be taken. In another example, in a gynecological procedure, the size of a fibroid can determine what type of treatment should be applied or used.

Similarly, in laser procedures, the laser settings can be different based on the type and/or size of a target (e.g., a stone). For example, when the stone is large, a surgeon may decide to fragment the stone into smaller pieces, and then switch the setting (e.g., the intensity of the laser) to reduce the smaller pieces to dust. The system can, once the size of the target is estimated using the approaches described above, recommend segmenting the target into smaller pieces first. The surgeon can then choose to accept or reject this recommendation. Alternatively, the system can automatically perform the suggested procedure based on the estimated target size. Regardless of whether the surgeon accepts the system's recommendation, or the system automatically performs the recommended procedure, the system can automatically or, upon receiving an approval, adjust the intensity or other parameter(s) (e.g., pulse width, duty cycle, frequency, etc.) of the laser to segment the target and then reduce the segmented pieces of the target.

Such a process has the advantage of significantly reducing the time needed to perform a medical procedure. For example, breaking a large stone into pieces and then reducing the smaller pieces to dust can shorten the overall procedure time when compared to the amount of time required to reduce the large stone itself to dust without fragmenting it first by 60 to 70 percent. Thus, allowing the system to automatically estimate the target size and implement a corresponding treatment based on the size of the target can allow medical procedures to proceed and finish more quickly and efficiently.

Figure 2:
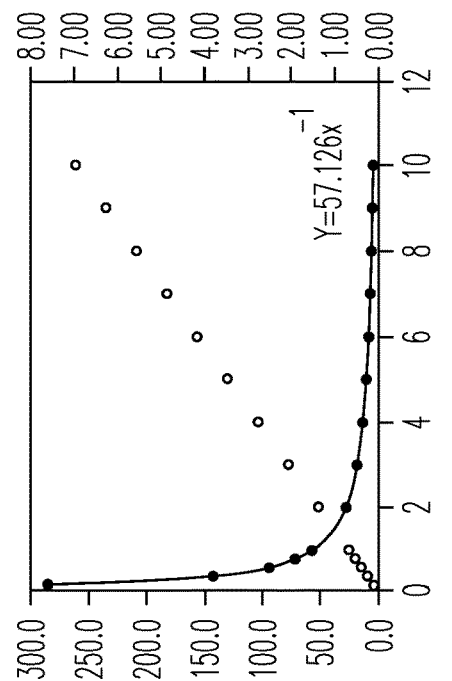
FIG. 2 illustrates an example of a calibration curve obtained theoretically.

FIG. 2 illustrates an example of a calibration curve 200 obtained theoretically. In the example illustrated in FIG. 2, various parameters such as a dimension of the laser beam footprint such as the diameter of a 200 μm laser beam footprint/aiming beam, a number of vertical pixels for the endoscopic sensor, and the vertical field of view in a medium (based on the indexes of refraction of the medium and the laser fiber used) can be known. For example, the diameter of an aiming beam emitted from a 200 μm laser fiber can be known to be 0.4 mm at the target. Further, the endoscope video sensor is known to have a particularly sized array, such as a 200×200 array, and the vertical field of view of the video sensor in water can be known to be 70 degrees. Using this information, the distance of the target from the tip of the endoscope and the total number of pixels of the laser beam diameter on the endoscopic image can be plotted to obtain the calibration curve 200.

More specifically, based on the known parameters, for each distance, the height corresponding to the half angle of the field of view in the medium can be computed. For example, at each distance a corresponding height of the field of view can be calculated by multiplying the distance by the tangent of the half angle (35 degrees) of the vertical field of view. The number of pixels per mm can be calculated using, for example, 100 pixels (i.e., the number of pixels in half of the 200×200 array) divided by the height of the field of view. Multiplying this number by the diameter of the aiming beam (e.g., 0.4 mm) can provide the number of pixels per 200 μm fiber at the particular distance.

When the distances and the pixel numbers are plotted, calibration curve 200, which is similar to the calibration curve 108 of FIG. 1C, can be obtained and used to determine the distance of the target from the tip of the scope at any distance. An advantage of this calibration approach is that, because the relationship between the number of pixels of the laser beam diameter on the endoscopic image and the distance of the target from the tip of the endoscope correlates to the index of refraction of the medium near the target, once the system is calibrated, it does not have to be re-calibrated (since treatments are always performed endoscopically in a medium such as water).

Figure 3:
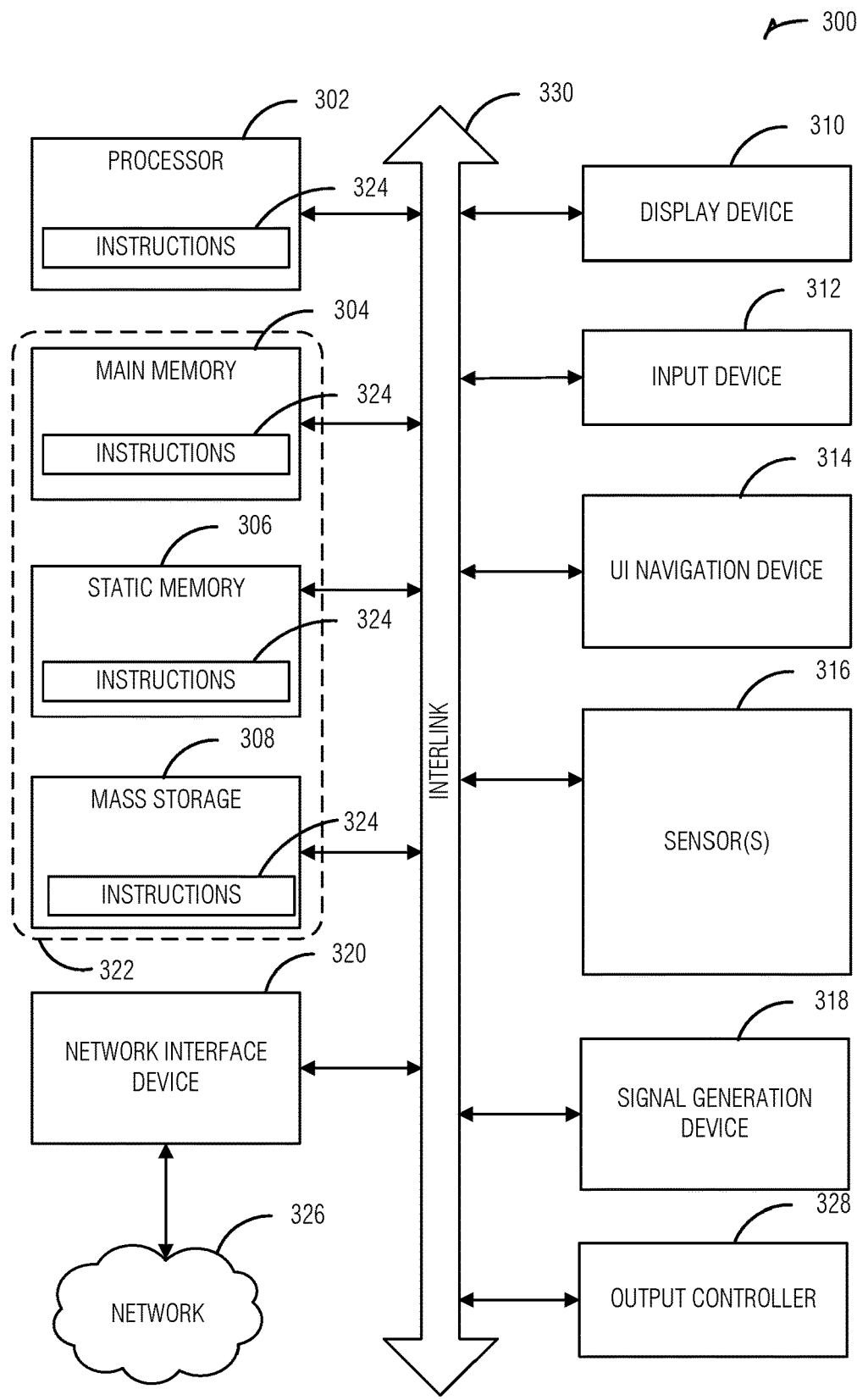
FIG. 3 is a block diagram illustrating an example of a machine upon which one or more embodiments may be implemented.

FIG. 3 is a block diagram of an example machine 300 upon which any one or more of the techniques (e.g., methodologies) discussed herein may perform. In alternative embodiments, the machine 300 may operate as a standalone device or may be connected (e.g., networked) to other machines. In a networked deployment, the machine 300 may operate in the capacity of a server machine, a client machine, or both in server-client network environments. In an example, the machine 300 may act as a peer machine in peer-to-peer (P2P) (or other distributed) network environment. The machine 300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 300 may include a hardware processor 302 (e.g., a central processing unit (CPU), a graphics processing unit (GPU), a hardware processor core, field programmable gate array (FPGA), or any combination thereof), a main memory 304 and a static memory 306, some or all of which may communicate with each other via an interlink (e.g., bus) 330. The machine 300 may further include a display unit 310, an alphanumeric input device 312 (e.g., a keyboard), and a user interface (UI) navigation device 314 (e.g., a mouse). In an example, the display unit 310, input device 312 and UI navigation device 314 may be a touch screen display. The machine 300 may additionally include a storage device (e.g., drive unit) 308, a signal generation device 318 (e.g., a speaker), a network interface device 320, and one or more sensors 316, such as a global positioning system (GPS) sensor, compass, accelerometer, or other sensor. The machine 300 may include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 308 may include a machine readable medium 322 on which is stored one or more sets of data structures or instructions 324 (e.g., software) embodying or used by any one or more of the techniques or functions described herein. The instructions 324 may also reside, completely or at least partially, within the main memory 304, within static memory 306, or within the hardware processor 302 during execution thereof by the machine 300. In an example, one or any combination of the hardware processor 302, the main memory 304, the static memory 306, or the storage device 316 may constitute machine readable media.

While the machine readable medium 322 is illustrated as a single medium, the term "machine readable medium" may include a single medium or multiple media (e.g., a centralized or distributed database, and/or associated caches and servers) configured to store the one or more instructions 324.

The term "machine readable medium" may include any medium that is capable of storing, encoding, or carrying instructions for execution by the machine 300 and that cause the machine 300 to perform any one or more of the techniques of the present disclosure, or that is capable of storing, encoding, or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 324 may further be transmitted or received over a communications network 326 using a transmission medium via the network interface device 320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards), IEEE 802.15.4 family of standards, peer-to-peer (P2P) networks, among others. In an example, the network interface device 320 may include one or more physical jacks (e.g., Ethernet, coaxial, or phone jacks) or one or more antennas to connect to the communications network 326. In an example, the network interface device 320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 300, and includes digital or analog communications signals or other intangible medium to facilitate communication of such software.

The calibration curves discussed in FIG. 1C and/or FIG. 2 can be obtained either empirically or theoretically. The calibration curve can represent a relationship between (i) the number of pixels of a laser beam diameter (or other dimension described above) on an image, or an object dimension (such as a diameter, a cross-sectional area, a perimeter, a radius or an arc length of the object) on an image (such as an endoscopic image) and (ii) a distance of a target from the tip of the scope. The endoscopic image can be obtained from a video sensor such as a camera coupled to the endoscope (e.g., located at a distal end of the endoscope).

Figure 4:
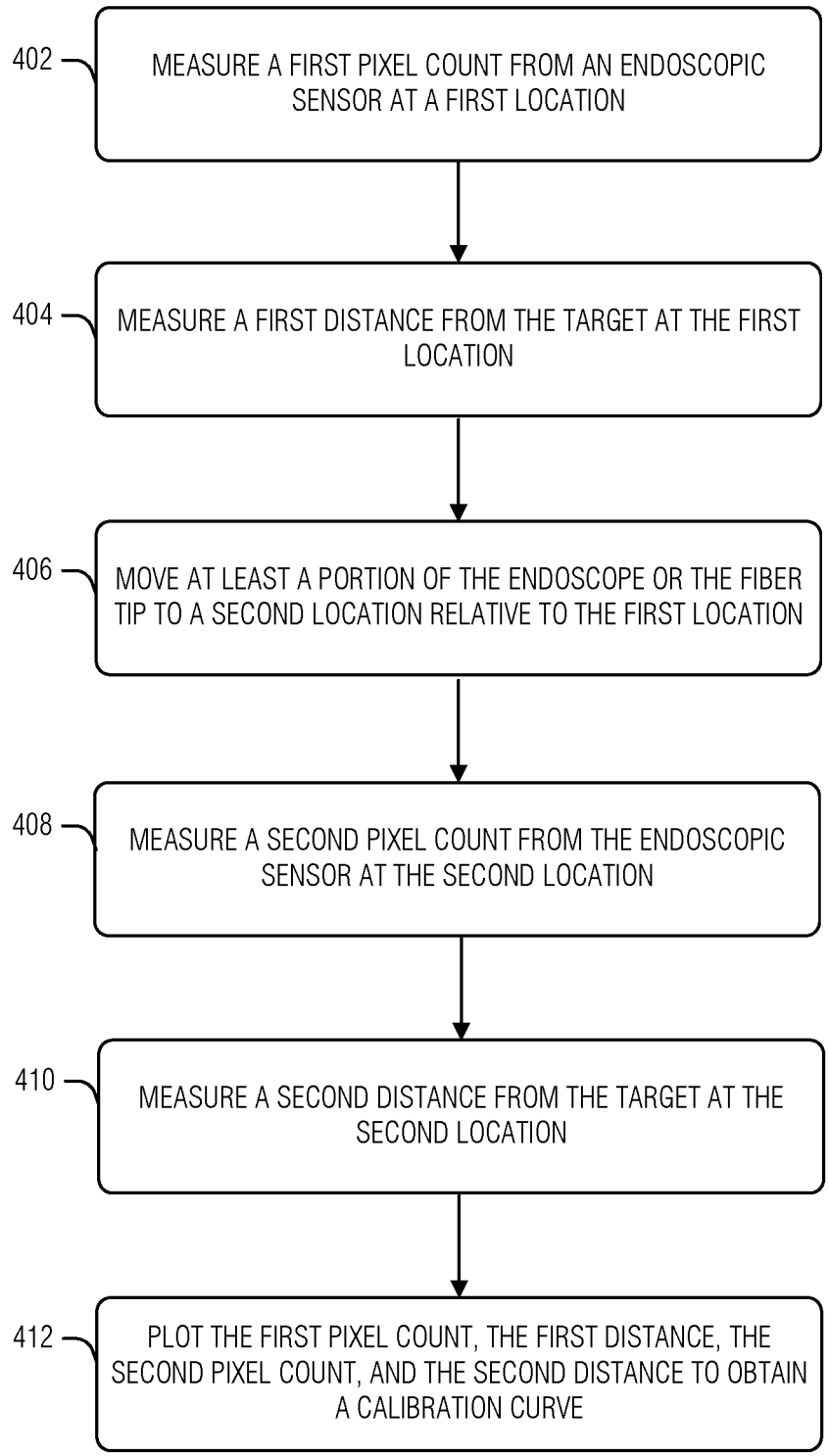
FIG. 4 illustrates an example flow diagram of a method of obtaining a calibration curve empirically.

FIG. 4 illustrates an example flow diagram of a method 400 of obtaining a calibration curve empirically in accordance herewith. Operation 402 can include measuring a first pixel count from an endoscopic sensor at a first location. In an example, the first pixel count can be the number of pixels of a dimension of the laser beam aiming footprint (or other dimension described above) or an object (e.g., a portion of a surgical fiber, such as the tip of the surgical fiber) located in close proximity to the target (or, in some embodiments, contacting the target) on an endoscopic image (e.g., an image taken from a video sensor such as a camera associated with the endoscope). The first location can be a first distance from the target. The distance from the target which at Operation 404 can be measured. The measurement can be based on, for example, an amount of the laser fiber tip that is extending from the tip of the scope using one or more markings on the insulating jacket of the fiber scope which can be seen by the endoscopic video sensor. Operation 406 can include moving at least a portion of the endoscope and/or the fiber tip to a second location relative to the first location. In an example, a distal end of the endoscope (e.g., the end of the endoscope from which the fiber tip protrudes and/or contains the video sensor) can be moved away from or closer to the target. Additionally, or alternatively, the portion of the fiber tip extending from the tip of the endoscope can be extended or made longer, or retracted or made shorter, such that the tip of the endoscope is closer to or farther away from the target at the second location.

Operation 408 can include measuring a second pixel count from the endoscopic sensor at the second location, and Operation 410 can include measuring a second distance from the target (e.g., the distance from the target at the second location). As discussed above for FIGS. 1A and 1B, at each of the first location and the second location there will be a corresponding number of pixels on the endoscopic image ($X_1$ pixels at the first location and $X_2$ pixels at the second location). Generally, as the tip of the scope and/or the fiber is closer to the target, the more pixels there will be on the corresponding endoscopic image. For example, at ten millimeters the pixel count can be 14.3 pixels per millimeter and at five millimeters the pixel count can be 28.6 pixels per millimeter. Operation 412 can include plotting the first pixel count, the first distance, the second pixel count and the second distance to obtain a calibration curve representing the relationship between the pixel count of the dimension of the laser beam aiming footprint (or other dimension described above) or an object located in close proximity to the target (or, in some embodiments, contacting the target) on the endoscopic image and the distance of the target from the tip of the endoscope. From this determined relationship, the distance from the target and/or the target dimensions can be determined when the tip of the scope is any distance from the target. It should be noted that while FIGS. 1A, 1B and 4 depict measurements at two locations, the calibration curve can be established based on measurements at more than two locations. Generally, the more locations used, the more accurate the calibration curve.

In an example, the dimension of the laser beam footprint/aiming beam can be known or measured at a certain distance from the target. Also, the pixel count of the array of the video sensor can be a known quantity, as can the field of view of the video sensor in a given medium. For example, as discussed above, a 200×200 array video sensor can have a vertical field of view of 70 degrees in water. These known values/quantities can be used to generate a calibration curve theoretically such as discussed with respect to FIG. 2.

Figure 5:
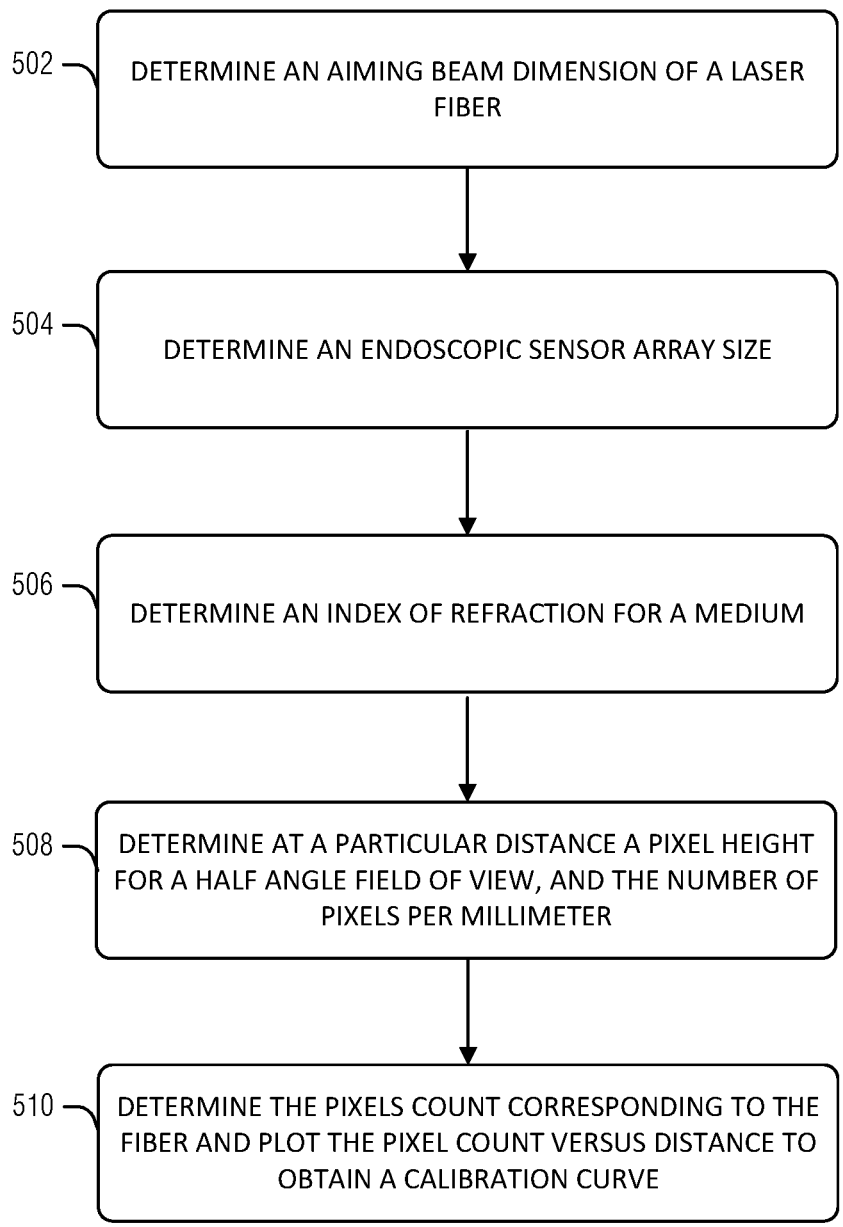
FIG. 5 illustrates an example flow diagram of a method of obtaining a calibration curve theoretically.

FIG. 5 illustrates an example flow diagram of a method 500 of obtaining a calibration curve theoretically. Operation 502 can include determining an aiming beam dimension of a laser fiber. For example, a 200 μm laser fiber can have an aiming beam having a diameter of 0.4 mm, which can be a known quantity or can be directly measured by aiming the laser at a target. Operation 504 can include determining an endoscopic array size. This can also be a known quantity based on the type of video sensor (e.g., camera) employed in the endoscope. For example, the video sensor can be known to have a 200×200 array. Operation 506 can include determining an index of refraction for a medium such as air, water, or the like. The type of medium can be determined based on the medical procedure being performed. For example, for gastrointestinal (GI) and gynecological procedures the medium is air. Therefore, the system can automatically choose or select the proper medium based on the procedure selected or inputted into the system by a user. For example, the surgeon can identify a GI procedure and the system can automatically select air. Conversely, if the procedure is to treat a biliary stone, the system can select saline as the medium. Based on the medium, the vertical field of view in the medium can be estimated.

Based on these (or other similar) known parameters, Operation 508 can include determining, at a particular distance, a height corresponding to a half angle field of view in the medium. Based thereon, a number of pixels per millimeter in the half angle field of view can be computed. For example, a 200×200 array may be known to have a vertical field of view in water of 70 degrees (thus a half angle of 35 degrees). Thus, at any distance a corresponding height of the field of view can be calculated by multiplying the distance by the tangent of the half angle (35 degrees) of the vertical field of view in the medium. The number of pixels per mm can then be calculated using 100 pixels (the number of pixels in half of the 200×200 array) divided by two times the height of the field of view.

Operation 512 can include determining the pixel count corresponding to the fiber having the known diameter of the aiming beam, and plotting the pixel count versus distance to obtain a calibration curve. In an example, the number of pixels per millimeter can be multiplied by the diameter of the aiming beam (e.g., 0.4 mm) to calculate the number of pixels per 200 μm fiber at the particular distance. The number of pixels per fiber can be plotted at the particular distance which will generate a calibration curve such as those discussed with respect to FIG. 2. Again, based on the calibration curve, the distance from the target and/or the dimensions of the target can be determined regardless of where the scope or the fiber is positioned.

Essentially, as long as the fiber (or other suitable object) is visible in the field of view of the video sensor, the calibration curve can be obtained because the cone of the field of view of the array is known for a particular medium. When the fiber is, for example, on the edge of the field of view the distance of the fiber from the tip of the endoscope is known (based on the design of the scope) and dimensions such as the diameter (or the other dimensions discussed above) of the fiber (or other suitable object) is known. Thus, the calibration can be made based on those known parameters and the parameters particular to whatever medium the scope is located in.

Figure 6:
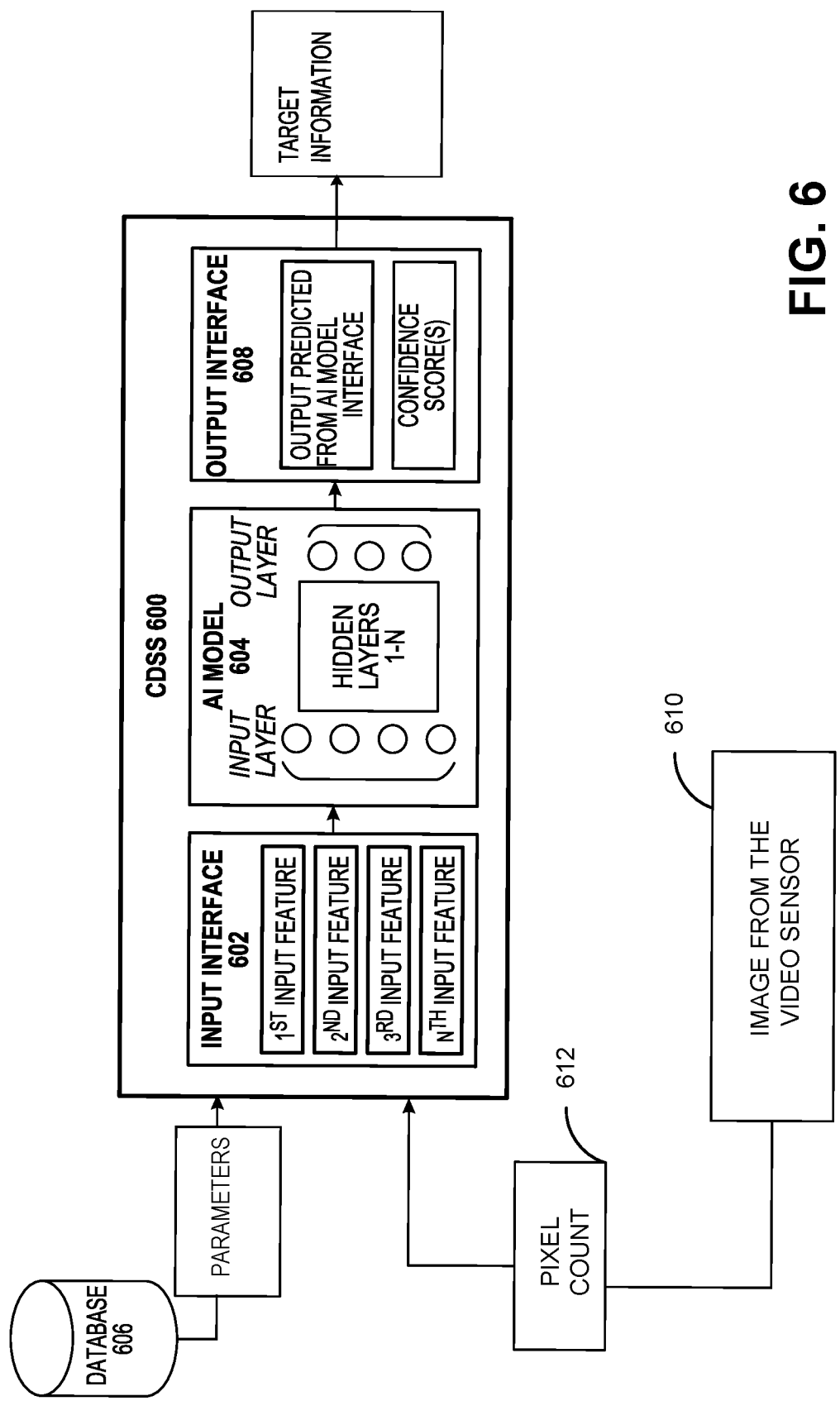
FIG. 6 illustrates a schematic diagram of an exemplary computer-based clinical decision support system (CDSS).

FIG. 6 illustrates a schematic diagram of an exemplary computer-based clinical decision support system (CDSS) 600 that is configured to determine information about a target, such as a distance of the target from the tip of a scope the size of the target based on the number of pixels in an image taken by a video sensor coupled to or attached to the scope, or any other similar information about the target. In various embodiments, the CDSS 600 includes an input interface 602 through which parameters such as the size of a surgical fiber, information about the video or imaging sensor, for example, the size of the array of the camera, and/or information about the scope which are specific to a patient's procedure are provided as input features to an artificial intelligence (AI) model 604, a processor which performs an inference operation in which the parameters are applied to the AI model to generate the determination of the distance from the target and/or the size of the target, and an output interface 608 through which the determined distance from the target or the size of the target is communicated to a user, e.g., a clinician.

In some embodiments, the input interface 602 may be a direct data link between the CDSS 600 and one or more medical devices that generate at least some of the input features. For example, the input interface 602 may transmit the dimensions or size of the surgical fiber directly to the CDSS 600 during a therapeutic and/or diagnostic medical procedure. In an example, information about the surgical fiber and/or the scope used during the procedure can be stored in a database 606. Additionally, or alternatively, the input interface 602 may be a classical user interface that facilitates interaction between a user and the CDSS 600. For example, the input interface 604 may facilitate a user interface through which the user may manually enter the information about the surgical fiber and/or the scope. Additionally, or alternatively, the input interface 602 may provide the CDSS 600 with access to an electronic patient record or the scope and/or surgical fiber being used during the procedure and any of its dimensions discussed above from which one or more input features may be extracted. In any of these cases, the input interface 602 is configured to collect one or more of the following input features in association with one or more of a specific patient, a type of medical procedure, a type of scope, a type of video sensor connected to the scope, or the type of surgical fiber to be used, on or before a time at which the CDSS 600 is used to assess the information about the size of the surgical fiber, the video or imaging sensor, the scope and/or the medium in which the procedure will take place.

An example of an input feature can include a dimension of the surgical fiber to be used during the procedure.

An example of an input feature can include what type of video or imaging sensor is coupled to the scope, and parameters such as the size of the camera or video array of the sensor.

An example of an input feature can include the type of scope being used during the procedure.

An example of an input feature can include an amount of the surgical fiber extending from the tip of the scope.

An example of an input feature can be the type of medium in which the procedure will take place and/or in which the scope is located.

An example of an input feature can include a video image from the video sensor 610.

An example of an input feature can include a pixel count 612 of the field of view of the video sensor.

Based on one or more of the above input features, the processor performs an inference operation using the AI model 604 to generate the determined distance of the target from the tip of the scope and/or the size of the target. For example, input interface 602 may deliver the one or more of the input features listed above into an input layer of the AI model 604 which propagates these input features through the AI model 604 to an output layer. The AI model 604 can provide a computer system the ability to perform tasks, without explicitly being programmed, by making inferences based on patterns found in the analysis of data. The AI model 604 explores the study and construction of algorithms (e.g., machine-learning algorithms) that may learn from existing data and make predictions about new data. Such algorithms operate by building an AI model from example training data in order to make data-driven predictions or decisions expressed as outputs or assessments.

There are two common modes for machine learning (ML): supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

Another type of ML is federated learning (also known as collaborative learning) that trains an algorithm across multiple decentralized devices holding local data, without exchanging the data. This approach stands in contrast to traditional centralized machine-learning techniques where all the local datasets are uploaded to one server, as well as to more classical decentralized approaches which often assume that local data samples are identically distributed. Federated learning enables multiple actors to build a common, robust machine learning model without sharing data, thus allowing to address critical issues such as data privacy, data security, data access rights and access to heterogeneous data.

In some examples, the AI model 604 may be trained continuously or periodically prior to performance of the inference operation by the processor. Then, during the inference operation, the patient specific input features provided to the AI model 604 may be propagated from an input layer, through one or more hidden layers, and ultimately to an output layer that corresponds to the information about the target. For example, when evaluating the images, the system can determine the number of pixels on the endoscopic image, determine how far the surgical fiber is extended from the tip of the endoscope, determine the dimension of a laser aiming beam footprint on the endoscopic image, determine the height of the field of view for the video sensor, and determine a calibration curve. Then, the system can use the calibration curve to determine the distance from the tip of the scope and/or the surgical fiber to the target and characteristics of the target such as the height of the target or the width of the target.

During and/or subsequent to the inference operation, the information about the target can be communicated to the user via the output interface 608 (e.g., a user interface (UI)) and/or automatically cause a surgical laser connected to the processor to perform a desired action. For example, based on the size of the target the system may cause the surgical laser to emit energy to ablate the target, adjust the amount of ablation energy, or move a portion of the scope.

Figure 7:
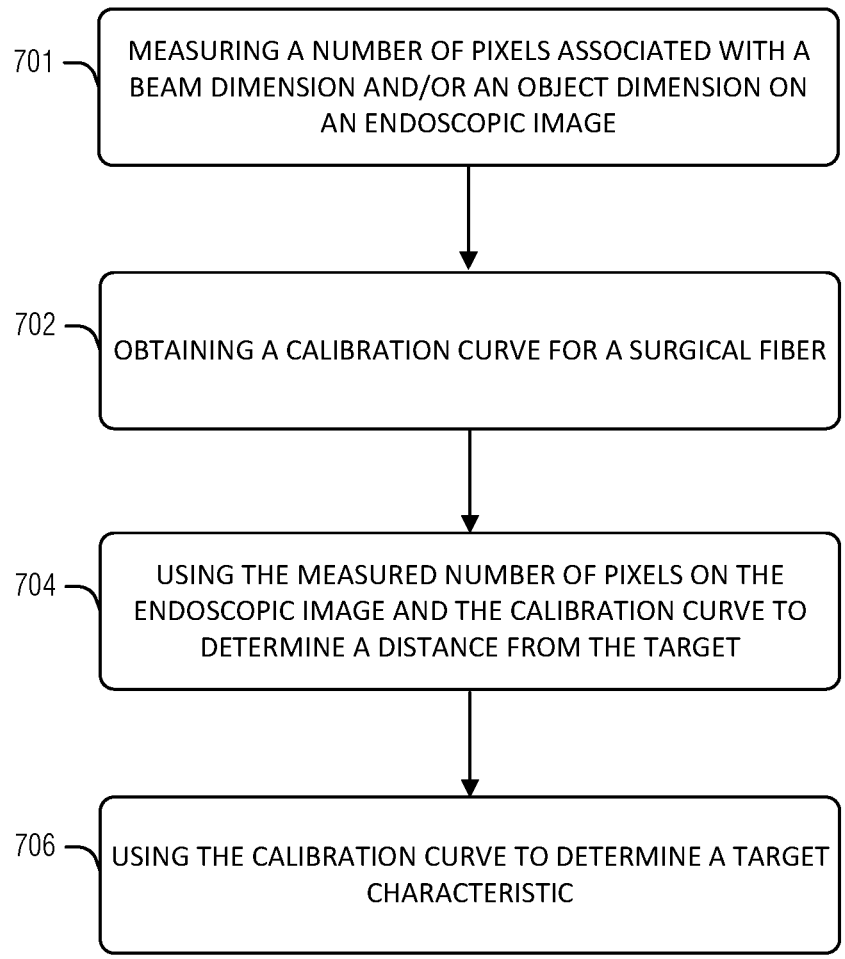
FIG. 7 illustrates an example method of using a calibration curve to determine target characteristics.

FIG. 7 illustrates an example method of determining target characteristics in accordance herewith. Operation 701 can include measuring a number of pixels associated with (i) a beam dimension (e.g., a laser beam diameter footprint, a cross-sectional area of a laser beam, a laser beam radius, or an arc length of a footprint of a laser beam) and/or (ii) an object dimension (e.g., a diameter, a cross-sectional area, a perimeter, a radius, or an arc length of a laser fiber tip) on an endoscopic image in a laser procedure. Operation 702 can include obtaining a calibration curve for a surgical fiber. The calibration curve can be obtained theoretically or empirically such as through the methods described in FIGS. 1A-1C, FIG. 2, or FIGS. 4-5, or by any other suitable process. Operation 704 can include using the measured number of pixels on the endoscopic image obtained in Operation 701 and using the calibration curve obtained in Operation 702 to determine a distance from the target. Additionally or alternatively, Operation 706 can include determining a target characteristic, for example, a size of the target such as the height or width of the target. For example, the pixel size can be computed by dividing the diameter of the laser aiming beam by its corresponding total number of pixels on the endoscopic image; based on the computed pixel size and the total number of pixels corresponding to the target height/width on the endoscopic image, the height/width of the target can be estimated. In an example, once the calibration process is complete, the aiming beam can be projected from the fiber tip onto the surface of a target, and that projection will adhere to the calibrated parameters. Therefore, the user can know how many pixels are visible based on the amount of the fiber tip that can be seen in the endoscopic image, and thus can know how far from the target that the tip of the fiber and/or the tip of the scope is located. Similarly, the user can know the number of pixels corresponding to the dimension of the aiming beam on the surface of the target and can determine the height and/or the width of the target in pixels, which can be used to determine an estimated size of the target.

In an example, once the calibration curve is obtained in Operation 702, whether it is obtained theoretically or empirically, the calibration curve can be used to determine the distance from the target at Operation 704 or be used to determine the target characteristic at Operation 706. Or, stated differently, Operation 704 and Operation 706 can be performed independently of each other or in any order (e.g., the size of the target can be determined first and then the distance from the target can be determined), or Operations 704 and 706 can be performed at the same time or substantially the same time as each other.

ADDITIONAL NOTES AND EXAMPLES

Example 1 is a method of acquiring a target characteristic comprising: (i) obtaining a relationship between (i) a number of pixels associated with a light beam reflected from a target or an object located in proximity to the target on an endoscopic image obtained from a video sensor coupled to an endoscope and (ii) a distance of the target from a tip of the endoscope; (ii) measuring the number of pixels associated with the light beam reflected from the target or the object located in proximity to the target during a procedure; and (iii) based at least in part on the relationship obtained in step (i) and the measured number of pixels in step (ii), determining at least one of a size of the target or a distance of the target from the tip of the endoscope.

In Example 2, the subject matter of Example 1 optionally includes wherein obtaining the relationship between (i) the number of pixels associated with the light beam reflected from the target or the object located in proximity to the target on an endoscopic image and (ii) the distance of the target from the tip of the endoscope includes: measuring a first pixel count associated with a dimension of the light beam or a dimension of the object in a first image when the target is at a first distance from the tip of the endoscope; measuring the first distance of the target from the tip of the endoscope; measuring a second pixel count associated with the dimension of the light beam or the dimension of the object in a second image when the target is at a second distance from the tip of the endoscope; measuring the second distance of the target from the tip of the endoscope; and establishing, the relationship based at least in part on the measured first pixel count, second pixel count, first distance and second distance.

In Example 3, the subject matter of Example 2 optionally includes wherein the dimension of the light beam comprises at least one of a diameter footprint of a laser beam, a cross-sectional area of the laser beam, a radius of the laser beam, or an arc length of a footprint of the laser beam.

In Example 4, the subject matter of any one or more of Examples 2-3 optionally include wherein the dimension of the object comprises at least one of a diameter, a cross-sectional area, a perimeter, a radius or an arc length of a laser fiber tip.

In Example 5, the subject matter of any one or more of Examples 1-4 optionally include recommending, based at least in part on the determined size of the target and/or the determined distance of the target from the tip of the endoscope, a treatment procedure.

In Example 6, the subject matter of any one or more of Examples 1-5 optionally include determining a type of medium in which the target is located, wherein the obtained relationship is based at least in part on a calibration curve corresponding to the type of medium.

In Example 7, the subject matter of Example 6 optionally includes wherein the type of medium is determined based at least in part on one of a type of medical procedure, a comparison of an observed size of the target to an actual size of the target, or a user input.

In Example 8, the subject matter of any one or more of Examples 6-7 optionally include wherein the type of medium is at least one of water, air, or saline.

In Example 9, the subject matter of any one or more of Examples 1-8 optionally include determining whether a new type of medium in which the target is located is present; and if so, (i) obtaining an updated relationship corresponding to the new type of medium and (ii) determining the size of the target and/or the distance of the target from the tip of the endoscope based at least in part on the updated relationship.

In Example 10, the subject matter of any one or more of Examples 1-9 optionally include wherein obtaining the relationship between (i) the number of pixels associated with the light beam reflected from the target or the object located in proximity to the target on an endoscopic image and (ii) the distance of the target from the tip of the endoscope comprises: obtaining (i) a dimension of the light beam or a dimension of the object, (ii) a number of pixels corresponding to the video sensor and (iii) an index of reflection of a medium in which the target is located; computationally determining, for each distance of the target from the tip of the endoscope, a pixel count associated with the dimension of the light beam or the dimension of the object; and establishing the relationship based at least in part on the distance of the target from the tip of the endoscope and the corresponding pixel count associated with the dimension of the light beam or the dimension of the object.

In Example 11, the subject matter of any one or more of Examples 1-10 optionally include computing a pixel size associated with the endoscopic image; determining a pixel count corresponding to the target on the endoscopic image; and based at least in part on the computed pixel size and the determined pixel count corresponding to the target, determining the size of the target.

Example 12 is a system comprising: at least one processor; and memory coupled to the at least one processor, the memory configured to store instructions that, when executed by the at least one processor, cause the at least one processor to execute operations, the operations comprising: (i) obtaining a relationship between (i) a number of pixels associated with a light beam reflected from a target or an object located in proximity to the target on an endoscopic image obtained from a video sensor coupled to an endoscope and (ii) a distance of the target from a tip of the endoscope; (ii) measuring the number of pixels associated with the light beam reflected from the target or the object located in proximity to the target during a procedure; and (iii) based at least in part on the relationship obtained in step (i) and the measured number of pixels in step (ii), determining at least one of a size of the target or a distance of the target from the tip of the endoscope.

In Example 13, the subject matter of Example 12 optionally includes wherein obtaining the relationship between (i) the number of pixels associated with the light beam reflected from the target or the object located in proximity to the target on an endoscopic image and (ii) the distance of the target from the tip of the endoscope includes: measuring a first pixel count associated with a dimension of the light beam or a dimension of the object in a first image when the target is at a first distance from the tip of the endoscope; measuring the first distance of the target from the tip of the endoscope; measuring a second pixel count associated with the dimension of the light beam or the dimension of the object in a second image when the target is at a second distance from the tip of the endoscope; measuring the second distance of the target from the tip of the endoscope; and establishing, the relationship based at least in part on the measured first pixel count, second pixel count, first distance and second distance.

In Example 14, the subject matter of Example 13 optionally includes wherein the dimension of the light beam comprises at least one of a diameter footprint of a laser beam, a cross-sectional area of the laser beam, a radius of the laser beam, or an arc length of a footprint of the laser beam.

In Example 15, the subject matter of any one or more of Examples 13-14 optionally include wherein the dimension of the object comprises at least one of a diameter, a cross-sectional area, a perimeter, a radius, or an arc length of a laser fiber tip.

In Example 16, the subject matter of any one or more of Examples 12-15 optionally include the operations further comprising: recommending, based at least in part on the determined size of the target and/or the determined distance of the target from the tip of the endoscope, a treatment procedure.

In Example 17, the subject matter of any one or more of Examples 12-16 optionally include the operations further comprising: determining a type of medium in which the target is located, wherein the obtained relationship is based at least in part on a calibration curve corresponding to the type of medium.

In Example 18, the subject matter of Example 17 optionally includes wherein the type of medium is determined based at least in part on one of a type of medical procedure, a comparison of an observed size of the target to an actual size of the target, or a user input.

In Example 19, the subject matter of any one or more of Examples 12-18 optionally include the operations further comprising: determining whether a new type of medium in which the target is located is present; and if so, (i) obtaining an updated relationship corresponding to the new type of medium and (ii) determining the size of the target and/or the distance of the target from the tip of the endoscope based at least in part on the updated relationship.

In Example 20, the subject matter of any one or more of Examples 12-19 optionally include wherein obtaining the relationship between (i) the number of pixels associated with the light beam reflected from the target or the object located in proximity to the target on an endoscopic image and (ii) the distance of the target from the tip of the endoscope comprises: obtaining (i) a dimension of the light beam or a dimension of the object, (ii) a number of pixels corresponding to the video sensor and (iii) an index of reflection of a medium in which the target is located.

In Example 21, the subject matter of any one or more of Examples 12-20 optionally include the operations further comprising: computing a pixel size associated with the endoscopic image; determining a pixel count corresponding to the target on the endoscopic image; and based at least in part on the computed pixel size and the determined pixel count corresponding to the target, determining the size of the target.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A method of acquiring a target characteristic comprising:
   (i) obtaining a relationship between (i) a number of pixels associated with a light beam reflected from a target or an object located in proximity to the target on an endoscopic image obtained from a video sensor coupled to an endoscope and (ii) a distance of the target from a tip of the endoscope;
   (ii) measuring the number of pixels associated with the light beam reflected from the target or the object located in proximity to the target during a procedure;
   (iii) based at least in part on the relationship obtained in step (i) and the measured number of pixels in step (ii), determining at least one of a size of the target or a distance of the target from the tip of the endoscope; and
   (iv) determining a type of medium in which the target is located, wherein the obtained relationship is based at least in part on a calibration curve corresponding to the type of medium.

2. The method of claim 1, wherein obtaining the relationship between (i) the number of pixels associated with the light beam reflected from the target or the object located in proximity to the target on an endoscopic image and (ii) the distance of the target from the tip of the endoscope includes:
   measuring a first pixel count associated with a dimension of the light beam or a dimension of the object in a first image when the target is at a first distance from the tip of the endoscope;
   measuring the first distance of the target from the tip of the endoscope; measuring a second pixel count associated with the dimension of the light beam or the dimension of the object in a second image when the target is at a second distance from the tip of the endoscope;
   measuring the second distance of the target from the tip of the endoscope; and
   establishing, the relationship based at least in part on the measured first pixel count, second pixel count, first distance and second distance.

3. The method of claim 2, wherein the dimension of the light beam comprises at least one of a diameter footprint of a laser beam, a cross-sectional area of the laser beam, a radius of the laser beam, or an arc length of a footprint of the laser beam.

4. The method of claim 2, wherein the dimension of the object comprises at least one of a diameter, a cross-sectional area, a perimeter, a radius or an arc length of a laser fiber tip.

5. The method of claim 1, further comprising:
   recommending, based at least in part on the determined size of the target and/or the determined distance of the target from the tip of the endoscope, a treatment procedure.

6. The method of claim 1, wherein the type of medium is determined based at least in part on one of a type of medical procedure, a comparison of an observed size of the target to an actual size of the target, or a user input.

7. The method of claim 1, wherein the type of medium is at least one of water, air, or saline.

8. The method of claim 1, further comprising:
   determining whether a new type of medium in which the target is located is present; and
   if so, (i) obtaining an updated relationship corresponding to the new type of medium and (ii) determining the size of the target and/or the distance of the target from the tip of the endoscope based at least in part on the updated relationship.

9. The method of claim 1, wherein obtaining the relationship between (i) the number of pixels associated with the light beam reflected from the target or the object located in proximity to the target on an endoscopic image and (ii) the distance of the target from the tip of the endoscope comprises:
   obtaining (i) a dimension of the light beam or a dimension of the object, (ii) a number of pixels corresponding to the video sensor and (iii) an index of reflection of a medium in which the target is located;
   computationally determining, for each distance of the target from the tip of the endoscope, a pixel count associated with the dimension of the light beam or the dimension of the object; and establishing the relationship based at least in part on the distance of the target from the tip of the endoscope and the corresponding pixel count associated with the dimension of the light beam or the dimension of the object.

10. The method of claim 1, further comprising:

computing a pixel size associated with the endoscopic image;

determining a pixel count corresponding to the target on the endoscopic image; and based at least in part on the computed pixel size and the determined pixel count corresponding to the target, determining the size of the target.

11. A system comprising:

at least one processor; and memory coupled to the at least one processor, the memory configured to store instructions that, when executed by the at least one processor, cause the at least one processor to execute operations, the operations comprising:
 (i) obtaining a relationship between (i) a number of pixels associated with a light beam reflected from a target or an object located in proximity to the target on an endoscopic image obtained from a video sensor coupled to an endoscope and (ii) a distance of the target from a tip of the endoscope;
 (ii) measuring the number of pixels associated with the light beam reflected from the target or the object located in proximity to the target during a procedure;
 (iii) based at least in part on the relationship obtained in step (i) and the measured number of pixels in step (ii), determining at least one of a size of the target or a distance of the target from the tip of the endoscope; and
 (iv) determining a type of medium in which the target is located, wherein the obtained relationship is based at least in part on a calibration curve corresponding to the type of medium.

12. The system of claim 11 wherein obtaining the relationship between (i) the number of pixels associated with the light beam reflected from the target or the object located in proximity to the target on an endoscopic image and (ii) the distance of the target from the tip of the endoscope includes:

measuring a first pixel count associated with a dimension of the light beam or a dimension of the object in a first image when the target is at a first distance from the tip of the endoscope;

measuring the first distance of the target from the tip of the endoscope; measuring a second pixel count associated with the dimension of the light beam or the dimension of the object in a second image when the target is at a second distance from the tip of the endoscope;

measuring the second distance of the target from the tip of the endoscope; and establishing, the relationship based at least in part on the measured first pixel count, second pixel count, first distance and second distance.

13. The system of claim 12, wherein the dimension of the light beam comprises at least one of a diameter footprint of a laser beam, a cross-sectional area of the laser beam, a radius of the laser beam, or an arc length of a footprint of the laser beam.

14. The system of claim 12, wherein the dimension of the object comprises at least one of a diameter, a cross-sectional area, a perimeter, a radius, or an arc length of a laser fiber tip.

15. The system of claim 11, the operations further comprising:

recommending, based at least in part on the determined size of the target and/or the determined distance of the target from the tip of the endoscope, a treatment procedure.

16. The system of claim 11, wherein the type of medium is determined based at least in part on one of a type of medical procedure, a comparison of an observed size of the target to an actual size of the target, or a user input.

17. The system of claim 11, the operations further comprising:

determining whether a new type of medium in which the target is located is present; and if so, (i) obtaining an updated relationship corresponding to the new type of medium and (ii) determining the size of the target and/or the distance of the target from the tip of the endoscope based at least in part on the updated relationship.

18. The system of claim 11, wherein obtaining the relationship between (i) the number of pixels associated with the light beam reflected from the target or the object located in proximity to the target on an endoscopic image and (ii) the distance of the target from the tip of the endoscope comprises:

obtaining (i) a dimension of the light beam or a dimension of the object, (ii) a number of pixels corresponding to the video sensor and (iii) an index of reflection of a medium in which the target is located;

computationally determining, for each distance of the target from the tip of the endoscope, a pixel count associated with the dimension of the light beam or the dimension of the object; and establishing the relationship based at least in part on the distance of the target from the tip of the endoscope and the corresponding pixel count associated with the dimension of the light beam or the dimension of the object.

19. The system of claim 11, the operations further comprising:

computing a pixel size associated with the endoscopic image;

determining a pixel count corresponding to the target on the endoscopic image; and based at least in part on the computed pixel size and the determined pixel count corresponding to the target, determining the size of the target.

\* \* \* \* \*